United States Patent Office 3,224,328
Patented Dec. 21, 1965

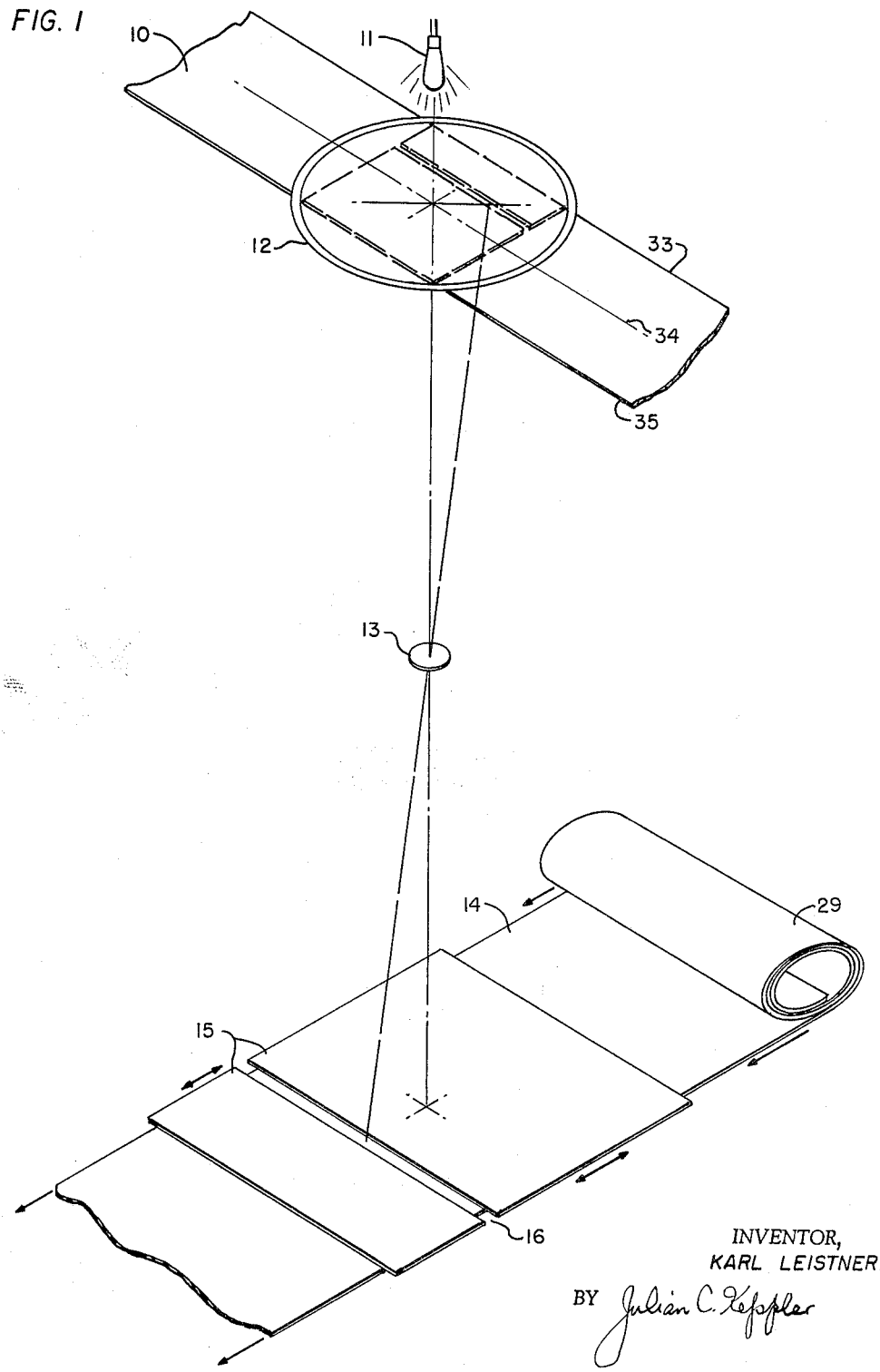

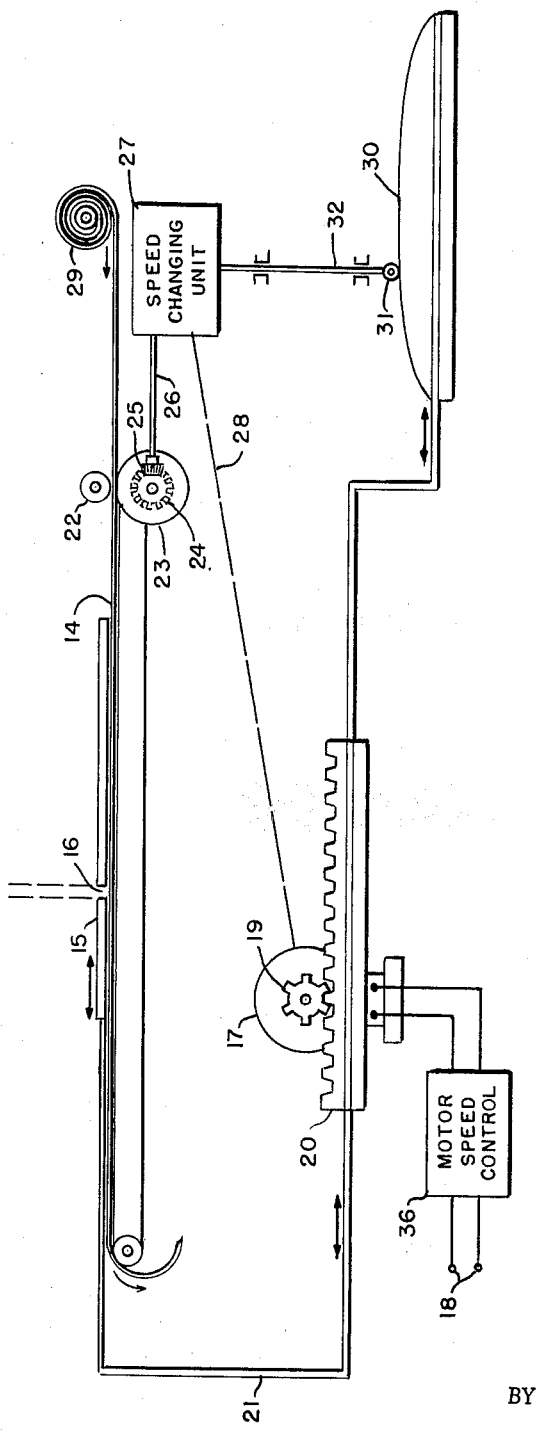

3,224,328
RECTIFIER FOR LINE-SCAN AERIAL IMAGES
Karl Leistner, Eatontown, N.J., assignor to the United States of America as represented by the Secretary of the Army
Filed Feb. 6, 1963, Ser. No. 256,776
5 Claims. (Cl. 88—24)
(Granted under Title 35, U.S. Code (1952), sec. 266)

The invention described herein may be manufactured and used by or for the Government for governmental purposes, without the payment of any royalty thereon.

This invention relates to apparatus for geometrically rectifying images which have been constructed by a line scanning operation of ground terrain for a moving aircraft.

In such a system the modulated radiation derived from the terrain surveyed is directed upon a sensing device such as a photocell or infra red cell which converts the radiation to a voltage modulated proportionally to the radiation intensity. This voltage in turn modulates a glow device such as a neon lamp. The light from the lamp is concentrated to a narrow beam which is very rapidly scanned transversely of a sensitive film strip while the film is moved uniformly lengthwise. Successive scan lines construct an image of the terrain upon the film. The film is curved to the radius defined by the distance from the lamp to the film surface. The above scanning system or similar counter parts thereof are known and not a part of the invention.

The characteristics of the record made by such a system require special rectifying means to produce a true scale reproduction of the terrain. Conventional rectifying systems such as those for correcting photographic mapping procedures or the like will not function to rectify images produced by the above outlined scanning technique.

The present invention provides a highly efficient and rapid means for rectifying an image produced as above outlined and moreover initial scanning may be performed at night by employing an infra red sensitive detecting means. Photographic techniques cannot be practiced at night without some form of artificial light such as a large and heavy high power flash system.

A subsequent mathematical analysis will more clearly show the nature and degree of distortion of the initial image to be corrected by the technique of the invention.

The invention comprises a opto-mechanical system wherein the processed strip of film bearing the initial line scan record is held in a fixed plane and a substantially square portion thereof is illuminated by a light source and a light condensing lens overlying the selected area. An imaging lens is fixed on an axis perpendicular to the film plane and focuses the image of the illuminated area upon a transversely slotted template held close to a strip of printing paper whose longitudinal dimension is disposed at right angles to that of the film strip.

The image of the film is actinically impressed upon the paper strip by uniformly moving the slotted template lengthwise thereof. Simultaneously the paper strip is moved in the opposite direction at a varying speed determined by a speed controlling means which acts by virtue of the relative speeds of template and paper to expand the lateral dimensions of the image to correct the foreshortening thereof due to the initial scanning operation. The speed controlling means may be any suitable device such as a cam bearing the required corrective pattern which is conveyed to a variable speed device by movement of a follower riding on the cam.

The entire length of the film is rectified one section at a time. The total time consumed however is short because a single section is scanned in a matter of a few seconds or less. After exposure the strip may pass directly to a processing station to develop the latent image.

It is a primary object of the invention to provide a system for rapidly scale rectifying image patterns derived from line scanning of ground terrain from aircraft by daylight or in darkness.

A further object of the invention is to provide an image rectifying system wherein a true scale rectified print or diapositive of the terrain surveyed is produced by opto-mechanical means from a line scan aerial survey record.

A further object of the invention is to provide a rectifying apparatus of the type indicated which is compact and light in weight.

A still further object of the invention is to provide an apparatus which produces a true scale rectified print or transparency from a line scan aerial survey record the print having correct point to point scale in any direction.

A further object of the invention is to provide a rectifying apparatus which functions as above indicated and requires no electronic components.

A still further object of the invention is to provide a rectifying apparatus in which all moving parts thereof may be located at the image side of the optical system permitting them to be permanently assembled as a unit that can be used in conjunction with any suitable existing illuminating means. For example the unit may be placed upon the easel of any high quality photographic enlarger and aligned with the optical axis thereof.

Other objects and features of the invention will more appear from the following detailed description and will be particularly pointed out in the claims.

To provide a better understanding of the invention a particular embodiment thereof will be described and illustrated in the accompanying drawings wherein:

FIG. 1 is a general view of the basic elements of the apparatus.

FIG. 2 is a partially diagrammatic illustration of a driving means suitable for actuating the moving parts of the apparatus.

As pointed out above the nature of and suitable means for performing a line scan aerial record is known and may consist of a driven multifaceted mirror positioned to line scan the terrain vertically below an aircraft and transversely of the flight path. The mirror reflects the radiation picked up to a detector and/or a converter the output of which modulates a glow lamp. The lamp in turn projects a narrow beam upon a sensitive film strip by means of one or more lenses rotated at high speed in such a manner that the signals due to the scan are actinically impressed transversely upon the film line for line as the film is fed lengthwise. During this line for line exposure of the film it is shaped cylindrically the radius of the cylinder being the distance from the axis of rotation of the lenses to the film. A complete permanent record of the terrain is thus obtained by processing the film. However, this record does not present a true scale image. The scale lengthwise of the strip is uniform and determined by the velocity of the aircraft and its elevation from the ground. However the transverse scale is not uniform and must be rectified to produce a true scale representation throughout the picture format.

Expressing the rectification problem mathematically the flight path may be called the Y-axis and the X-axis that which extends perpendicular thereto. An object point $P_{(x,y)}$ is imaged at:

$$X' = C_1 \cdot r \cdot \arctan x/h \tag{1}$$

$$Y' = 1/v \cdot C_2 \cdot y \tag{2}$$

where $h$ is the altitude of the aircraft above ground, $r$ is the radius of a platen holding the film in the exposure station, V is the ground speed of the aircraft and $C_1$ and $C_2$ are factors characteristic of the recording equipment.

The image deformed by the above recording means may be used for computing real distances between a pair of points by using the necessary parameters of equipment and flight conditions but this is a time consuming procedure if many such distances are to be computed. Moreover this unrectified image is useless for compiling true scale large area maps or like procedures.

This deformed image to be useful for the usual applications of such information should be transformed into a new image in which the coordinates of the image point are:

$$X' = f \cdot X \quad (3)$$
$$Y' = f \cdot Y \quad (4)$$

where $f$ is a constant scale factor.

The invention provides a compact and accurate apparatus for rectifying the distorted film record to provide an accurate scale reproduction of the terrain surveyed. Referring to FIG. 1 the numeral 10 indicates a strip of film containing the initial line scan image as a transparency. The film strip 10 may be of any convenient size. A 70 mm. strip has been found to be a suitable size. The edge perforations of such film may be convenient in handling and feeding the film automatically.

A portion of the film for example a length equal to its width is illuminated uniformly in any suitable manner such as by a light source 11 and a condensing lens 12. This portion of the film is projected and focused upon a rectifying plane below by a lens 13. During the rectifying operation the film 10 and lens 13 are held stationary.

At the rectifying plane a strip of printing paper or other sensitive material is exposed to the projected image by a focal plane scanning device similar to a focal plane shutter. The scanner 15 consists of an opaque template having a narrow transverse slot 16 therein. The strip 14 is held flat in the rectifying plane and is disposed with its long dimension at right angles to the long dimension of the film 10.

To perform the rectifying function the scanner 15 which covers the full width of the paper strip is moved lengthwise thereof at a constant rate and simultaneously the paper 14 is moved in the opposite direction at a varying rate computed to correct the scale of the distorted image on the film.

Any suitable mechanism may be used to accomplish this end. An example of such a mechanism is shown in FIG. 2 where the necessary movements are provided by an adjustable constant speed motor 17 connected to a power supply line 18. The motor has a gear 19 secured to its shaft which meshes with rack teeth upon a sliding bar 20. The bar moves parallel to the lengthwise dimension of the strip and is connected to the scanner 15 by a rigid driving connection 21 which moves the scanner along and close to the paper 14 at uniform speed.

The paper strip 14 is driven in the direction opposite to that of the scanner in any suitable manner such as by a pair of rolls 22 and 23 between which the paper passes. The roll 22 is driven while the roll 23 is pressed against the paper to impart the necessary drive thereto by the roll 22. The roll 22 is driven by a gear 24 fixed on the roll shaft. A second gear 25 meshes with gear 24 and is mounted on the output shaft 26 of a speed changing unit 27 the input shaft 28 of which is coupled to the motor 17. Desirably the paper is fed from a roll 29.

The bar 20 is also rigidly connected to a movable cam 30 to which the uniform movement of the bar is imparted. A cam follower 31 rides upon the cam and is mounted upon a speed control actuator rod 32 which in turn engages the speed changing elements in the unit 27 to control the speed of the roll 22 thereby to control the paper speed in accordance with the contour of the cam 30 throughout the traverse of the scanner 15. To execute the above operation the scanner may be moved in either direction.

The speed is greatest at the beginning of the scan when the geometric projection of the slot 16 on the film is at the edge 33 of the film while the speed is the slowest when the slot passes the center line 34 of the area scanned and then increases to maximum at the opposite edge 35 of the area. The speed of the paper transport towards both sides of the center line 34 is proportional to:

$$\frac{d \tan \phi}{d\phi} \quad (5)$$

i.e. to $$\sec^2 \phi \cdot d\phi \quad (6)$$

Tan $\phi$ is equal to $x/h$ of Equation 1 and therefore is derived from the ordinate $X'$ on the film 10 and the instrument factors $r$ and $C_1$.

On the film 10 equal angular scan increments are represented by equal linear increments in the $X'$ direction. These increments are now stretched on the paper 14 into increments proportional to (5) and this constitutes the process of rectification.

This operation is not sufficient to fulfill the requirement of Equations 3 and 4 i.e. that the scale factors for X and Y are equal. As seen from Equations 1 and 2 the factors relating $X'$ to X and $Y'$ to Y are different and have no fixed relationship since V can vary widely for the same value of $h$. To insure equal scale factors in both coordinates the equipment has adjustments for the proper absolute speed to be determined at the instant when the slot 16 passes the center line 34.

When the line scan record is made the aircraft pilot records his altitude and ground speed and when the rectifying operation is executed the apparatus is adjusted to incorporate this data. A suitable method for accomplishing this result is to provide the driving motor 17 with a speed adjustment 36 by means of which the absolute speed of the scanning slot in the template 15 at its midpoint of travel may be established. A calibration chart may be prepared which will indicate the absolute speed for a given combination of elevation and ground speed. For convenience the motor speed control 36 could be calibrated in absolute speed units. The minimum speed at which the paper must travel when the image of the slot 16 passes the center line 34 of the film is a function of the speed at which the slot 16 travels, as well as of the ratio of the scale values in the X and Y direction at the nadir. Using the designations of Equations 1 and 2, the scale in the Y direction can be written as $$Y'/Y = \frac{C_2}{V}$$

that in the X direction at the instant the scan axis passes the vertical is $$X'/X = \frac{C_1 \cdot r}{h}$$

If, as will usually be the case, the images in the X direction at the nadir is smaller than in the Y direction, it needs stretching by a factor $q$, which is $$q = \frac{h}{V} \cdot \frac{C_2}{C_1 \cdot r} \quad (7)$$

If the slot travel at a speed of $l$ mm./sec., the paper must, at the instant the slot passes the axis of lens 13, travel at a speed $p$ which is:

$$p = l(q-1) \text{ mm./sec.}$$

In operation of the apparatus successive portions of the elongated film strip 10 are recitified until the whole strip is processed. It may be found desirable to slightly overlap adjacent edges of the sections to insure accurate scale throughout the rectified print. The apparatus may be used to rectify the line scan record of a relatively small area of terrain which would be recorded on a small sheet of film and printed upon a corresponding sheet of paper instead of an elongated strip.

What is claimed is:

1. In combination with a processed line scan record, an apparatus for rectifying the distortion in the said record comprising means to illuminate said record, a focusing lens acting to project the image of the record upon a rectifying plane, a photosensitive sheet in said plane, a masking template overlying said sheet, said template having a narrow slot extending across its area and at right angles to the record scan lines, exposing means acting to move the template along and close to said sheet in a direction at right angles to said scan lines, driving means synchronized to said template driving means acting to move said sheet along the line of movement of the template and pattern actuated means acting to vary the speed of said sheet with respect to the template to effect rectification of the line scan image and thereby to print a rectified image upon said sheet.

2. An apparatus according to claim 1 and wherein the said template and photosensitive sheet are driven by the same power device.

3. An apparatus according to claim 1 and wherein the power device operates at constant rate of speed and means to adjust the speed rate thereof.

4. An apparatus according to claim 1 and wherein the driving means for the said photosensitive sheet moves the sheet in a direction opposite to that of the template.

5. In combination with a strip of photosensitive material upon which an aerial line scanning record has been made, an apparatus for geometrically rectifying said record comprising means for supporting said record in a fixed plane, a light source acting to illuminate a selected area of said record strip, a second strip of photosensitive material for receiving the rectified image spaced from said line scan strip and guided in a plane parallel to and extending lengthwise at right angles to said record strip, an imaging lens between said strips acting to project the image of the record strip upon the plane of said second strip, a scanning template overlying the the portion of the strip to be exposed and having a narrow slot extending transversely thereof, means to move said template lengthwise of said second strip at a constant speed the light passing through said slot acting to expose said strip and means to move said second strip at varying speeds relative to said template and means to control the pattern of speed ratios between template and strip to correct the distorted geometric scale of the line scan image.

References Cited by the Examiner
UNITED STATES PATENTS

| | | | |
|---|---|---|---|
| 2,785,599 | 3/1957 | Sonnberger | 88—24 |
| 2,928,734 | 3/1960 | Zampol | 96—27 |
| 3,046,832 | 7/1962 | Winzenburg | 88—16 |
| 3,066,572 | 12/1962 | Von Bubna-Littiz | 88—24 |

NORTON ANSHER, *Primary Examiner.*
RICHARD WINTERCORN, *Assistant Examiner.*